United States Patent [19]
Dean

[11] Patent Number: 5,979,686
[45] Date of Patent: Nov. 9, 1999

[54] LIQUID STORAGE TANK

[75] Inventor: Timothy S. Dean, Ocala, Fla.

[73] Assignee: Pro Poly of America, Inc., Ocala, Fla.

[21] Appl. No.: 09/122,757

[22] Filed: Jul. 27, 1998

Related U.S. Application Data

[62] Division of application No. 08/780,178, Dec. 26, 1996, Pat. No. 5,820,718.

[51] Int. Cl.⁶ .................................................. B65D 6/32
[52] U.S. Cl. ......................... 220/4.13; 220/613; 220/679
[58] Field of Search .................................... 220/612, 613, 220/678, 679, 4.12, 4.13, 562, 565, 581, 4.01, DIG. 29

[56] References Cited

U.S. PATENT DOCUMENTS

| | | |
|---|---|---|
| 1,842,735 | 1/1932 | Spence .................................... 220/679 |
| 2,252,539 | 8/1941 | Adams . |
| 3,279,971 | 10/1966 | Gardener . |
| 3,294,617 | 12/1966 | Way . |
| 3,856,458 | 12/1974 | Greenwald . |
| 3,953,015 | 4/1976 | Taylor et al. . |
| 5,322,539 | 6/1994 | Mathisen ................................. 220/678 |
| 5,609,267 | 3/1997 | Johnson et al. . |
| 5,641,088 | 6/1997 | Berger .................................... 220/613 |
| 5,820,718 | 10/1998 | Dean ..................................... 220/4.13 |

FOREIGN PATENT DOCUMENTS 1167107 11/1958 France ................................. 220/679

*Primary Examiner*—Stephen Castellano

[57] ABSTRACT

A liquid storage tank can be manufactured with improved efficiency and greater strength by creating bent sheets to form the sides and bottom portions of the tank. The interior corner of the bend is reinforced by an extrusion weld. Two or more of the side/bottom bent sections are then butt jointed together to form a rectangular, t-shaped, or other shaped tank. The tank is completed by two end pieces extrusion welded to the bent side/bottom pieces and a lid extrusion welded to the sides.

7 Claims, 5 Drawing Sheets

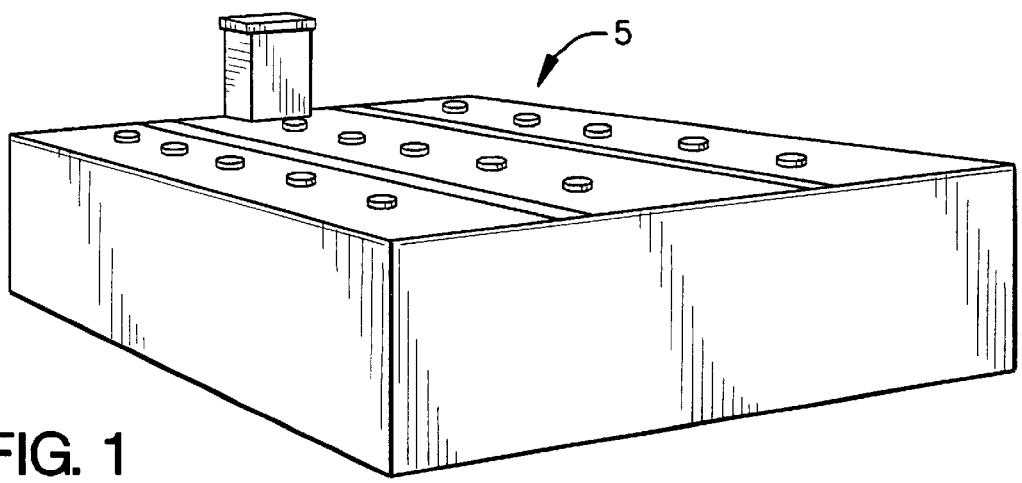
FIG. 1
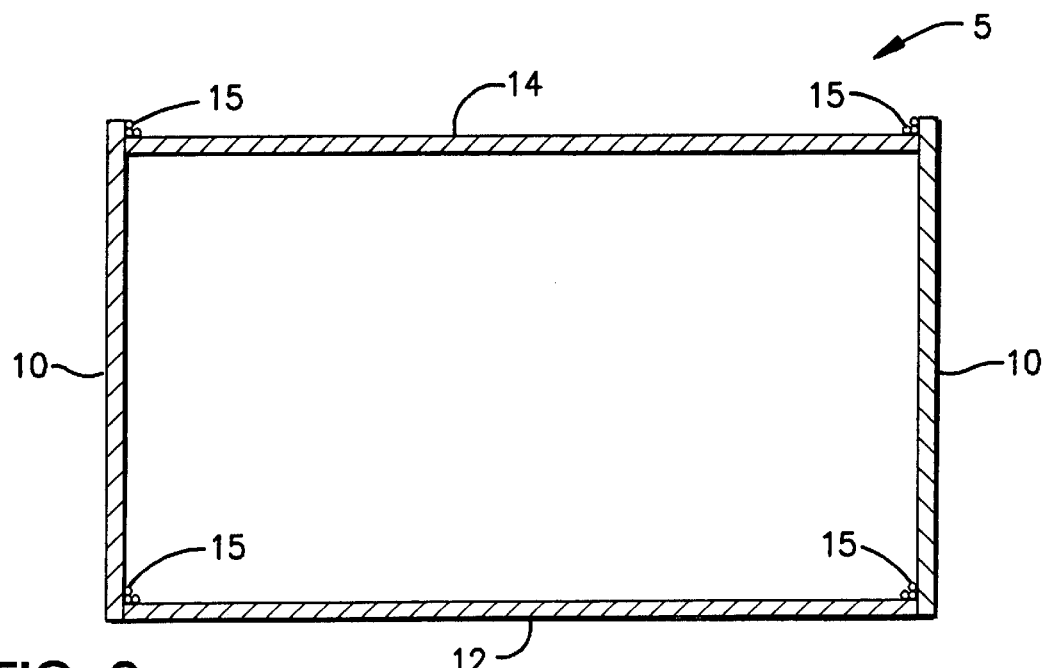
FIG. 2
FIG. 3a
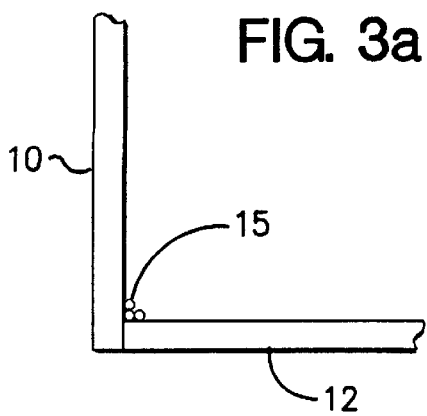
FIG. 3b
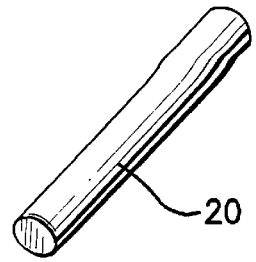

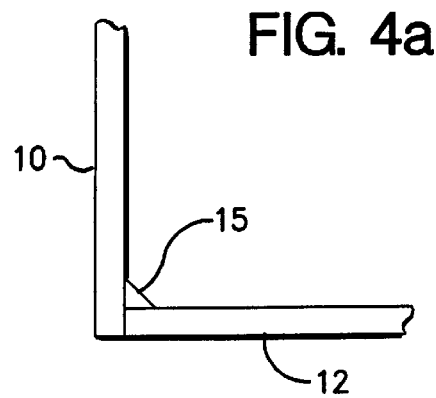
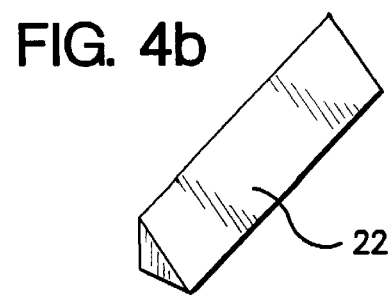
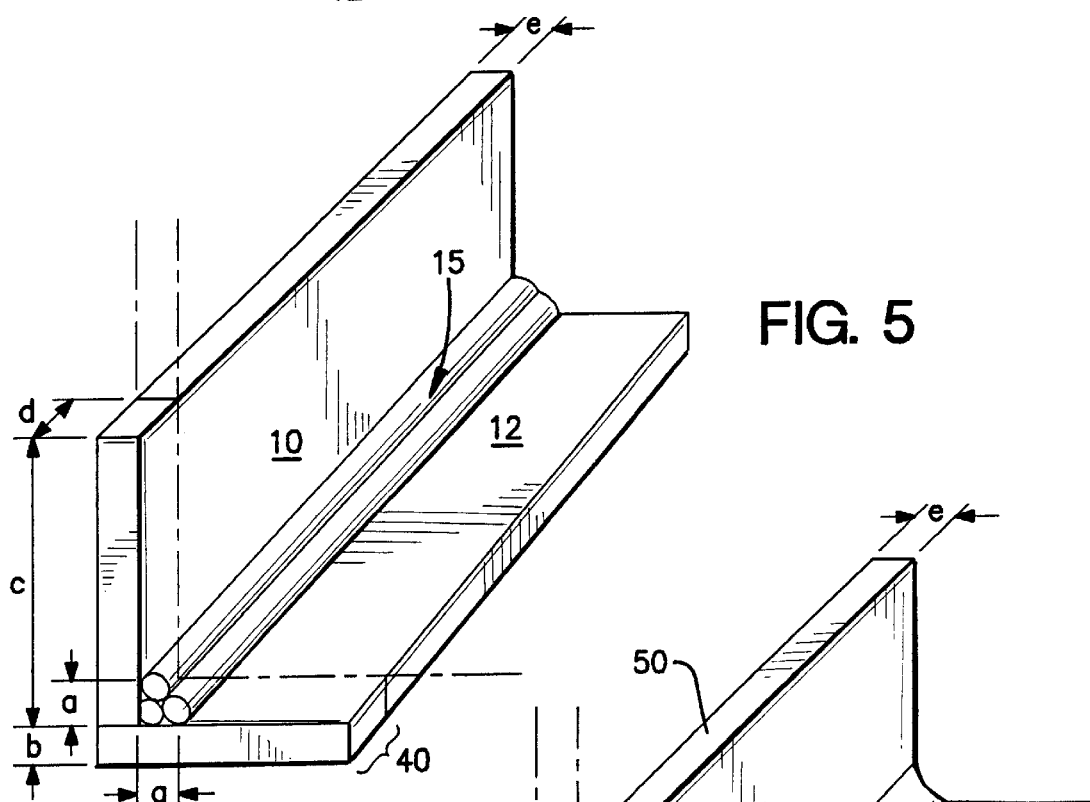
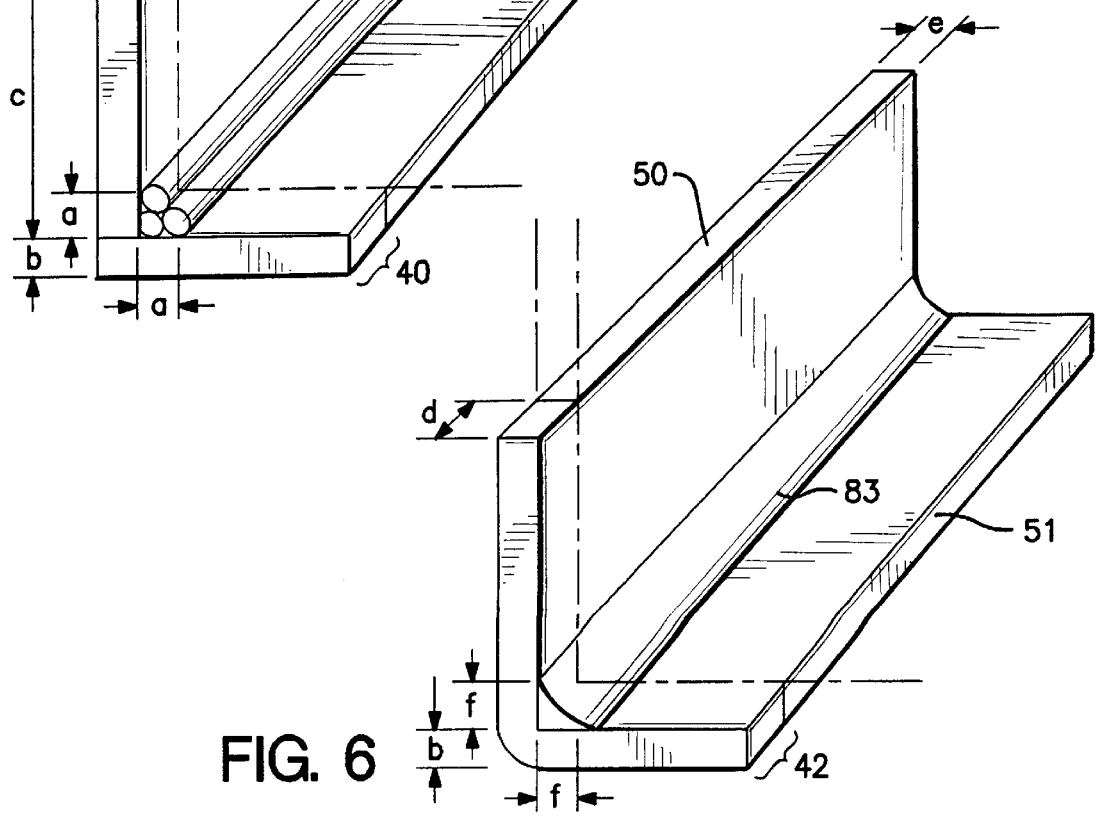

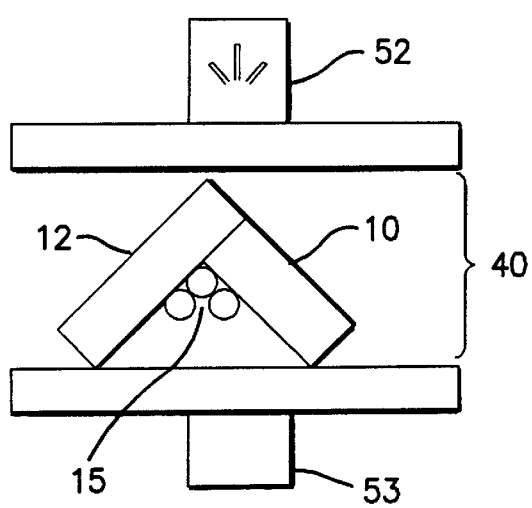
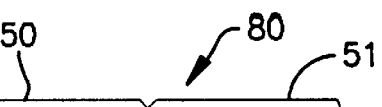
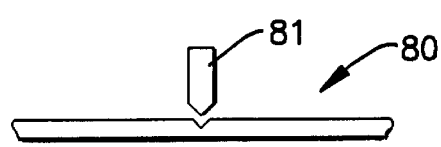
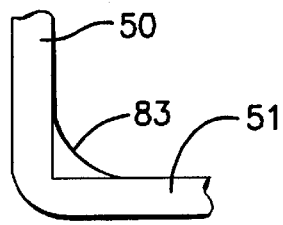
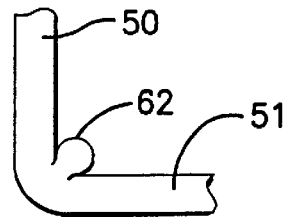
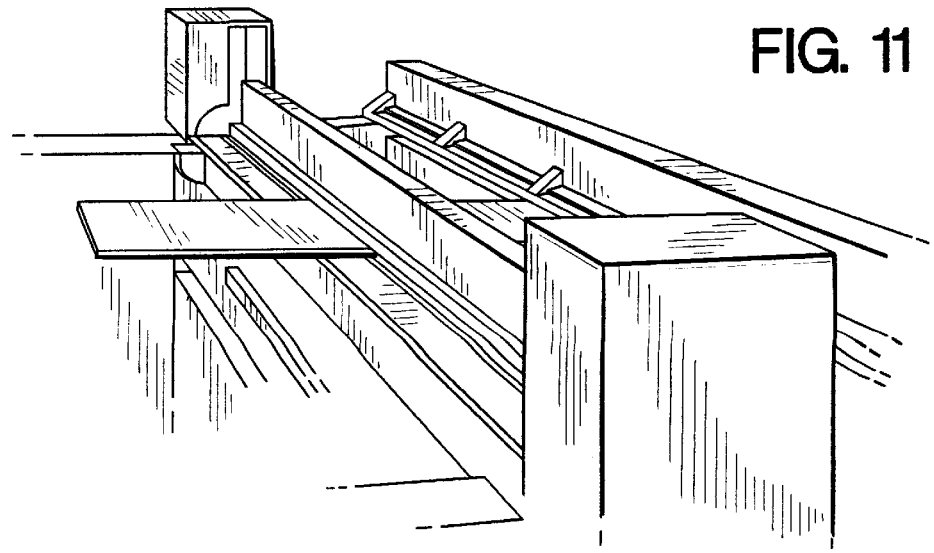

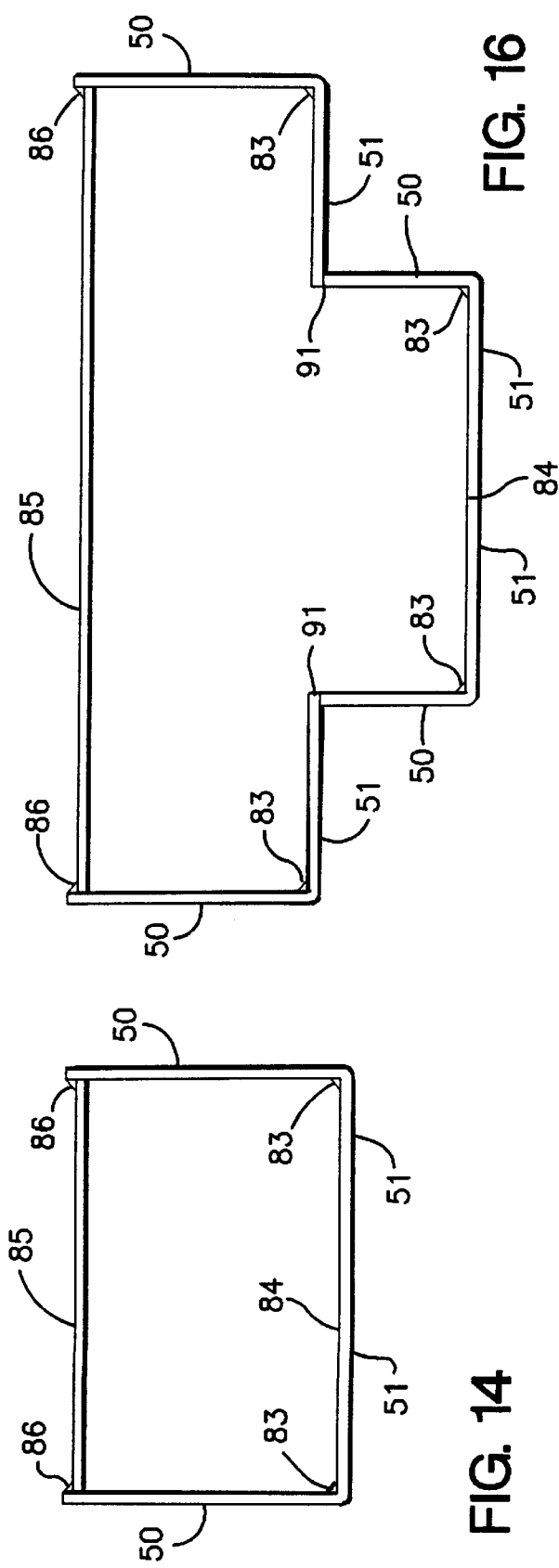
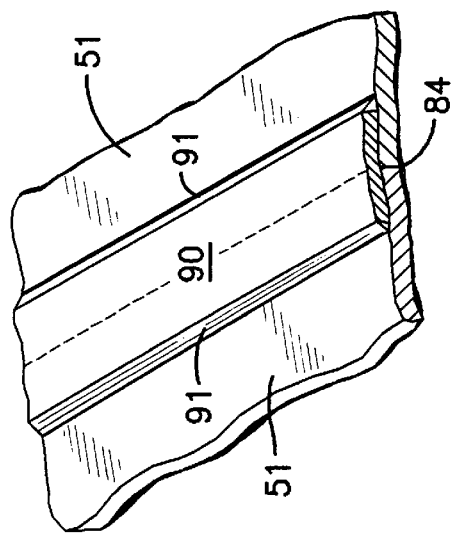
FIG. 16
FIG. 14
FIG. 15

LIQUID STORAGE TANK

This is a divisional of application Ser. No. 08/780,178, filed Dec. 26, 1996, now U.S. Pat. No. 5,820,718.

FIELD OF THE INVENTION

This invention relates to liquid storage tanks. More particularly, this invention relates to methods and apparatus for strengthening the junctions between the sides and bottom portions of liquid storage tanks.

BACKGROUND OF THE INVENTION

Large liquid storage tanks, such as those used on fire engines, etc., have high strength requirements due to the weight of the liquid stored in the tank. Liquid storage tanks for fire engines, for example, can hold a thousand gallons or more of water and must obviously do so with a high reliability.

Such liquid storage tanks have been developed with side, bottom and top pieces welded together to form the tank. Side, bottom and top pieces are shown in FIGS. 1 and 2. These pieces were hand welded together by a traditional weld, such as the triple weld shown in FIGS. 2, 3a and 3b, or by the tri-rod weld shown in FIG. 4. In the triple weld of FIGS. 2, 3a and 3b, a side piece 10 and a bottom piece 12, for example, were welded together by a hot tip hand welder guided along the side-bottom seam while the operator hand-pushed a round welding rod 20 into the hand welder. ⅛" welding rods 20 could be used with ½" width side 10 and bottom 12 pieces. The welder melted the welding rods 20 and applied them to the interior corner junction between the side piece 10 and the bottom 12. Three such welding rods 20 (FIG. 3b) were placed overlapping each other in the manner shown in FIG. 3a to form the weld 15.

As shown in FIG. 2, the triple welds 15 were used in the junctions formed between the abutting sides 20 and bottom 12. The welds 15 were also used in the junctions formed between the abutting sides 20 and top 14.

An alternative to the triple welds was the triangular rod weld 22, shown in FIG. 4. In the triangular weld embodiment, the side piece 10 was welded to the bottom piece 12 by a triangular welding rod 22 by pushing the rod 22 into the hot tip hand welder as the operator guided the hand welder along the side-bottom or side-top seam.

The triple weld 15 and the triangular rod weld 22 could hold the sides, bottom and top pieces together under the force of the water weight. But, improvements in strength are always desirable in order to increase tank capacities and to reduce material costs.

SUMMARY OF THE INVENTION

The present invention moves away from the use of separate side and bottom sheets to form the sides and bottoms of a liquid storage tank. Instead of butting two pieces together with a triple weld or a triangular rod weld, the present invention forms the side and a portion of the bottom of the tank from a single sheet. Then, contrary to conventional wisdom, the single sheet is welded at the interior corner in order to strengthen the already integral side-bottom junction.

The present invention provides this new way of manufacturing liquid storage tanks by bending sheets into contiguous side and bottom portions and then welding the interior corner of the bent sheets. According to the present invention, a sheet of material is cut to the proper size to be bent into a side and a bottom portion. The material is then heated on a hot sword along a line where the side and bottom portions will ultimately transition from one to the other. The material is then bent along the heated line and permitted to cool.

The bent sheet is left with a slag in the interior corner of the side-bottom junction. That slag is peeled off by the operator and, in its place, the operator applies an extrusion weld to fuse material into the interior corner of the side-bottom junction. The result is a dramatically stronger junction between the side and bottom than provided a butt joint with a triple weld or a triangular rod weld.

BRIEF DESCRIPTION OF THE DRAWINGS

These, as well as other objects and advantages of this invention, will be more completely understood and appreciated by careful study of the following more detailed description of a presently preferred exemplary embodiment of the invention taken in conjunction with the accompanying drawings, of which:

FIG. 1 is a perspective view of a rectangular liquid storage tank;

FIG. 2 is a cut-away view of a rectangular liquid storage tank;

FIGS. 3a and 3b are partial cut-away and partial perspective views of a corner from the tank of FIG. 2;

FIGS. 4a and 4b are partial cut-away and partial perspective views of an alternative corner to the corner of FIG. 3;

FIG. 5 is a perspective view of a test sample of the corner of FIG. 3;

FIG. 6 is a perspective view of a test sample according to the present invention;

FIG. 7 is a cut-away view of the test sample of FIG. 5 in the compression test apparatus;

FIGS. 8a and 8b are cut-away views of the present sheet material after routing and heating;

FIG. 9 is a cut-away view of the present sheet material from FIG. 8 after bending and welding;

FIG. 10 is a cut-away view of the present sheet material from FIG. 9 after bending according to an alternative embodiment;

FIGS. 11 and 12 are perspective views of the heating sword and bender of the present invention;

FIG. 14 is a cut-away view of a liquid storage tank according to one example embodiment of the present invention;

FIG. 15 is a perspective view of the bottom butt joint of the present invention; and FIG. 16 is a cut-away view of a liquid storage tank according to another example embodiment of the present invention.

DETAILED DESCRIPTION OF THE DRAWINGS

Figure 12:
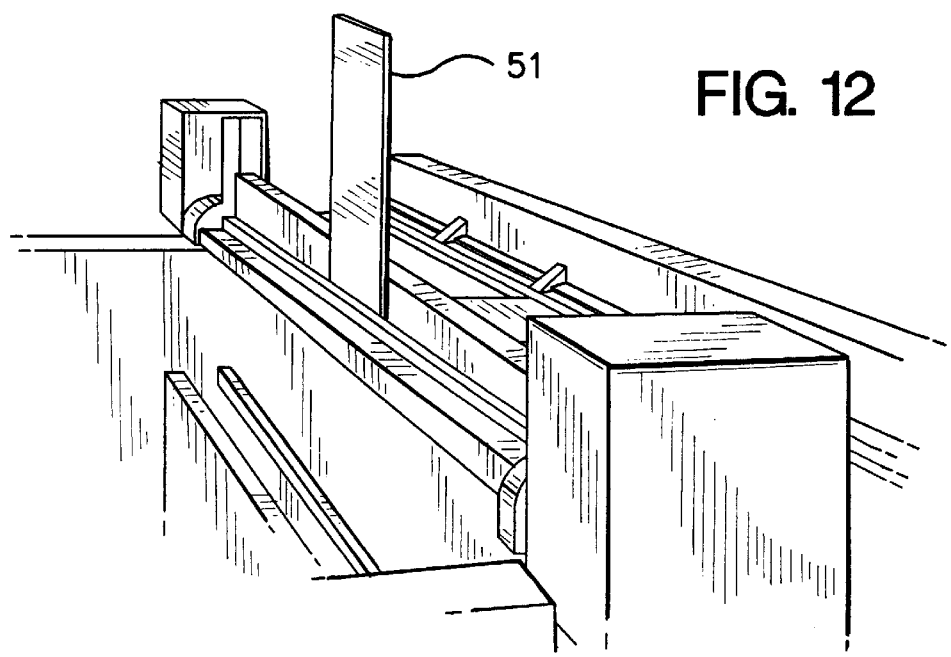

The present tanks are manufactured from an UV stabilized copolymer, such as is marketed under the tradename "Polyprene." This copolymer is an extruded composition of polypropylene and polyethylene with Carbon introduced in the extrusion for UV protection. The present copolymer material can be any suitable width dimension, such as ½".

One such suitable material is the "TI-4007-L" material sold by Aristech. Its technical data is outlined below:

TI-4007-L CO-POLYMER POLYPRO TECHNICAL DATA

| Property | Unit | Typical Value (1) | ASTM Method |
|---|---|---|---|
| Nominal Melt Flow[2] | g/10 min | 0.7 | D1238 |
| Density (3) | g/cm$^3$ | 0.901 | D792 |
| Tensile Strength a Yield[4] | psi | 3,600 | D638 |
|  | MPA | 25 |  |
| Elongation at Yield[4] | % | 13.0 | D638 |
| Flexural Modulus | psi | 160,000 | D790A |
|  | MPA | 1,103 |  |
| Izod Impact[5] |  |  |  |
| a. notched at 73° F. (23° C.) | ft-lb/in | 10.0 | D256 |
|  | J/m | 534 |  |
| b. notched at 0° F. (–18° C.) | ft-lb/in | 0.8 | D256 |
|  | J/m | 43 |  |
| Dart Drop Impact[6] | ft-lb | 30 | Aristech |
| at –22° F. (–30° C.) | J | 41 |  |
| Rockwell Hardness | R Scale | 78 | D785 |
| Melting Point[7] | ° F. | 324 | Aristech |
|  | ° C. | 162 |  |

(1) Injection molded specimens where applicable.
(2) 230° C./2.16 kg.
(3) at 73° F. (23° C).
(4) Type I specimen at 2 in/min (50 min/min) speed.
(5) ⅛ inch (3.2 mm) bas.
(6) 100-mβ (2.5 mm) plaque.
(7) by DSC.

In the present invention, sheets of the copolymer material are cut into appropriate sizes using any suitable cutting procedure. In the preferred embodiment, the material is cut using a router such that the sheet, when bent, will form one full tank side and one-half tank bottom, as shown, for example, in FIG. 14.

The side portion and the bottom half-portion are contiguous pieces, being distinguished one from the other only by a bend in the contiguous sheet, as shown in FIGS. 6 and 9. That is, the side portion 50 and the bottom half-portion 51 begin as a single, flat sheet. In FIG. 14, the cross-section of a rectangular tank using the present invention is shown in which the side portion 50 and the bottom half-portion 51 are bent at a perpendicular angle relative to each other. The tank is further made up of an identical, opposite, side portion 50 and bottom half portion 51. The two bend side/bottom pieces abut each other at a butt joint 84 at the bottom of the tank, as described in greater detail below with respect to FIG. 15.

In addition to the two bent side/bottom portions, the tank includes a tank top 85 and two end pieces (not shown). Using the two bent side/bottom portions greatly increases manufacturing efficiency and improves the strength of the side/bottom junction.

The relative strength of the junction was confirmed by a test involving a triple weld (FIG. 5) in comparison to the present weld (FIG. 6). As shown in FIG. 5, a side piece 10 and a bottom piece 12 are butt welded together using a triple weld 15, in the manner described in the Background Section above. The side and bottom material was 0.5" wide (dimensions "b" and "e") and 1.5" long (dimension "c"). The side 10 and bottom 12 were welded, resulting in 0.235" of contact surface between the triple weld 15 and the surfaces of the side 10 and bottom 12 (dimension "a"). Then, a bar sample (d=1") was taken along the "test bar cut line" to yield a sample 40 for testing.

A similar test bar sample was made of the present invention, as shown in FIG. 6. Here, the side 50 and bottom 42 form a contiguous bent sheet having an extrusion weld 83 overlapping each side/bottom by f=0.535". The widths of the material for the side 50 and bottom 51 was ½" (dimensions "b" and "e"), like the sample of FIG. 5. A bar sample (d=1") was then removed along the test bar cut line to yield the sample 42 for testing.

The samples 40 and 42 were then put into the vice 52/53 of FIG. 7. The vice was a "Tinius-Olsen 1000 Tensile Strain & Compression Tester." Although FIG. 7 shows only the triple weld sample 40, both samples 40 and 42 were placed into the vice 52/53 in a like fashion. The force was then applied to the vice 52/53 at a rate of 1" per minute compression to close it on the samples 40/42 until they yielded. A table identifying the yield forces is shown below:

TABLE OF COMPRESSION FORCES

| PRESENT INVENTION | | OTHER | |
|---|---|---|---|
| ½ EXTRUSION WELD W/BEND: | | TRIPLE BEAD: | |
| Equipment #1 | 710.0 lbs | Equipment #1 | 708.0 lbs |
| Equipment #2 | 791.3 lbs | Equipment #2 | 719.2 lbs |
| Equipment #3 | 699.1 lbs | Equipment #3 | 671.2 lbs |
| AVERAGE | 750.8 lbs | Equipment #4 | 667.8 lbs |
|  |  | Equipment #5 | 733.4 lbs |
|  |  | AVERAGE | 699.9 lbs |
| ½ EXTRUSION WELD: | | 3/16 HAND WELD: | |
| Equipment #1 | 759.2 lbs | Equipment #1 | 507.0 lbs |
| Equipment #2 | 760.5 lbs | Equipment #2 | 350.0 lbs |
| Equipment #3 | 700.5 lbs | Equipment #3 | 503.0 lbs |
| AVERAGE | 740.1 lbs | AVERAGE | 453.3 lbs |
|  |  | MULTI-ROD | |
|  |  | Equipment #1 | 430.0 lbs |
|  |  | Equipment #2 | 412.0 lbs |
|  |  | Equipment #3 | 387.0 lbs |
|  |  | AVERAGE | 409.7 lbs |

As can be seen from the above table, the bent edge according to the present invention provides greater compression strength than prior two-piece welded joints.

The method of preparing the present side/bottom portions is shown and described with respect to FIGS. 8 through 15.

In FIG. 8, the copolymer material 80 is shown having been routed along a junction line between the portion that will ultimately be the side 50 and the portion that will ultimately be the bottom 51. As also shown in FIG. 8, the copolymer material is then placed on a bending machine where a heated, Teflon coated metal sword is pressed onto the material for a certain time. In the preferred embodiment, the metal sword is approximately 65 inches long for copolymer sheets having dimensions of 48" by 128", but other sword dimensions are certainly within the scope of the present invention. With the ½ inch copolymer sheet stock described in the technical data sheet above, the metal sword can heat the copolymer material at 220° for 2½ to 5 minutes. After the heating process, an operator lifts the heating sword 81 and places the material into a bending machine, as shown in FIG. 11. The bending machine then lifts the material into a 90° position and holds it there until it cools into a permanently deformed state, as shown in FIG. 12. This cooling can be three minutes for the above described material.

A key part of the present invention is the inclusion of an extrusion weld (as opposed to a hand weld) 83 placed in the interior corner of the side 50 and bottom 51, as shown in FIG. 9. This extrusion weld on the interior corner provides reinforcement and strength to the bend junction between the side 50 and bottom 51.

An alternative embodiment of the present invention is to bend the sheet material 80 into the 90° position, as described above with respect to FIG. 8 and FIGS. 11–12, but without routing a crease along the junction line where the bend of FIG. 12 occurs. This creates a slag 62 in the form of a bead that runs down the interior corner between the side 50 and bottom 51. As it turns out, using the material described above, this slag 62 can be easily removed by an operator by simply peeling it away from the interior corner. The extrusion weld 63 is then placed in the corner 50, in the same manner as shown and described with respect to FIG. 9.

A key to the present invention is the extrusion weld on the inside edge of the bent material. This extrusion weld reinforces the material from any reduction of the physical properties of the material that may occur during the bending process. This extrusion weld is different from the triple weld (FIG. 3), which suffers the disadvantage of reheating the plastic walls after each weld rod is put down. The extrusion weld is also different from the triangular weld (FIG. 4) in that it does not utilize a hand welder that must be fed by the operator. One may note that since the triangular rod weld requires only one pass to form the weld, the hand welding method can be used in the installation of internal tank components.

Figure 13:
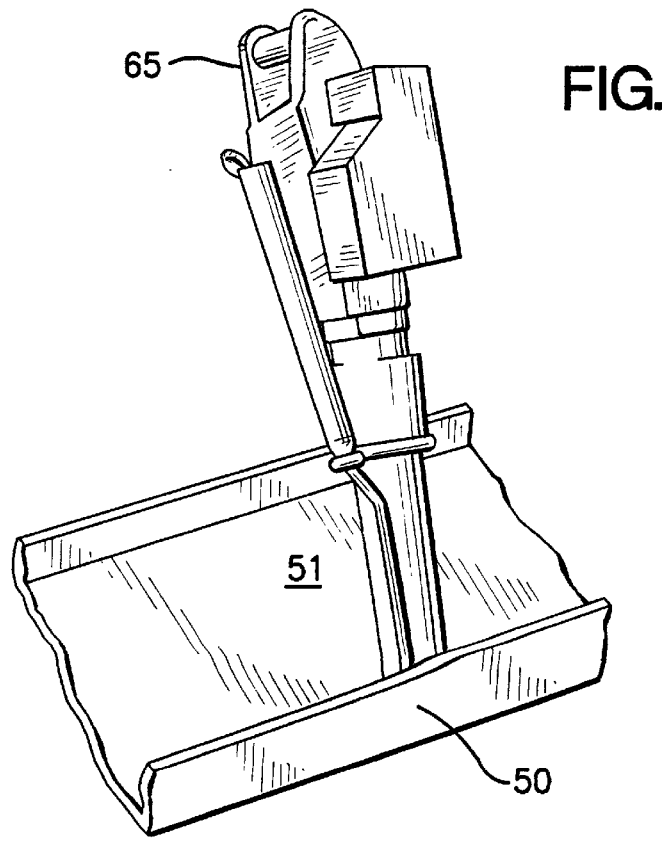
FIG. 13 is a perspective view of the extrusion welder placing a weld into a sample tank portion of the present invention.

The extrusion weld involves the use of an extrusion gun that is electronically controlled to melt the weld rod (in either ⅛ inch, 5/32 inch, or 3/16 inch round form) in a chamber to extrude a ½ inch weld, as shown in FIG. 6. Because of its uniform heat, the extrusion weld fuses more material with the joint of the weld parts than the other weld methods. The extrusion welding is shown in FIG. 13, in which the extrusion gun 65 is shown applying a weld in the interior corner of the side 50 and bottom 51 of a tank component. As shown in FIG. 13, the extrusion weld is applied by hand by moving the extrusion gun from one side of the bend junction to the opposite side of the bend junction.

FIG. 14 shows a cross-section of a rectangular tank according to the present invention. As shown in FIG. 14, two side/bottom portions, each having extrusion welds 83 in their interior corners, abut each other at a butt joint 84. That butt joint 84 is welded by fusing the two pieces of copolymer together by placing the two pieces onto a machine in which a heated sword is pressed between the two edges for 3½ minutes and then pressing the two heated sides together for 2½ minutes. A reinforcing copolymer strip 90 is then placed on top of the butt joint 84 and welded to the bottom portions 51 by extrusion welds 91.

Returning to FIG. 14, the top 85 is shown attached to the side portions 50 using a ½ inch fillet weld. The lids, of course, can only be welded on one side (the side away from the interior compartment of the tank) and thus are recessed below the top of the side portion 50, in order to create a corner in which the fillet weld 86 can be placed, as shown at the top of FIG. 14.

In addition to the components shown in FIG. 14, the tank must be completed with end portions (not shown), which are extrusion welded on the interior corners to the edges of the side/bottom 50/51 before the lid 85 is attached.

FIG. 16 illustrates an alternative embodiment of the present invention in which the bent side/bottom 50/51 portions create a t-shaped tank. As shown in FIG. 16, four side/bottom 50/51 portions, each having a weld 83, as described above, are welded together to form the t-shaped cross section. The lid 85 is welded to the sides 50 in the same way as described with respect to FIG. 14, by the fillet welds 86. The two side/bottom components forming each of the sides of the t-shaped tank are butt welded together by weld 91, which can be a butt weld in the same manner as butt weld 84, or can be a fillet weld in the manner of weld 86, or both. Note the overlapping piece on the butt weld 84 can be a ½ inch by 3 inch piece of copolymer.

As one of skill in this art can tell from a review of the present disclosure, many of the usual weld seams are eliminated by the present invention, resulting in a stronger tank. In addition, the extruded UV stabilized copolymer is a high impact material that resists stress cracking, retains stiffness and flexibility and has good impact strength in extreme temperatures. By using the present material with the present process, significant manufacturing efficiencies are realized for a significantly stronger liquid storage tank. The present invention can also realize a t-shape tank using only 9 solid pieces thus minimizing the number of welds that similar tanks requiring 14 pieces or more require.

As one of ordinary skill in this art will also recognize, the interior of these tanks may have certain accessories and features, including reinforcement gussets welded to the interior side walls, baffles, drains, etc.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A liquid storage tank, comprising:
   a shell of copolymer including:
      at least two bent shell pieces butt welded together to form at least part of two sides and a bottom of said tank, wherein:
         each shell piece is a single copolymer sheet bent to form two planes at a predetermined angle, and
         each said bent copolymer sheet has a removed slag and a reinforcing extrusion weld at an interior corner of said bend; and
      two planar side pieces extrusion welded to the two shell pieces perpendicular to at least one of said two planes of each said bent shell piece.

2. The tank of claim 1, further including a reinforcing shell piece welded onto said two bent shell pieces over said butt weld.

3. The tank of claim 1, including four said bent shell pieces, the first bent shell piece butt welded to the second bent shell piece at a first predetermined angle, the third bent shell piece butt welded to the fourth bent shell piece also at the first predetermined angle, and the second and third bent shell pieces butt welded together at substantially a 180 degree angle.

4. The tank of claim 1, wherein the copolymer is polypropylene and polyethylene.

5. The tank of claim 1, wherein the shell has a shell width and the reinforcing extrusion weld has a weld width approximately equal to the shell width.

6. The tank of claim 1, wherein the shell has a shell width and the reinforcing extrusion weld has a weld width larger than the shell width.

7. The tank of claim 1, further including a lid extrusion welded to said two bent shell pieces and said two planar side pieces.

* * * * *